May 17, 1932.  X. SEITZ  1,858,971
SHOCK ABSORBING DEVICE FOR MOTOR CARS
Filed July 17, 1929
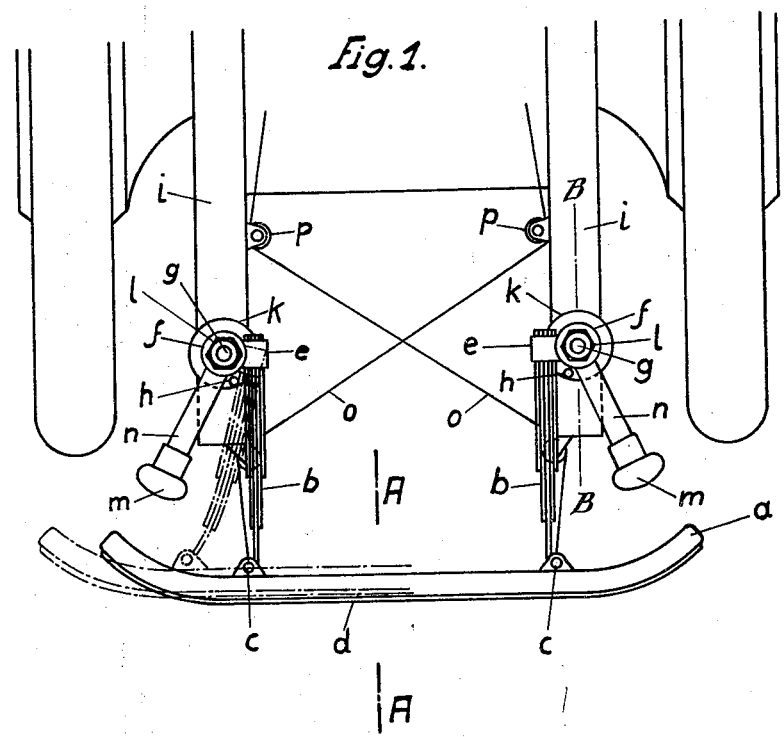
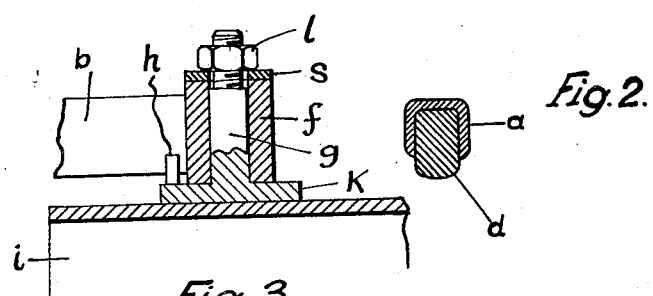
Inventor:
Xaver Seitz Patented May 17, 1932

1,858,971

UNITED STATES PATENT OFFICE

XAVER SEITZ, OF CONSTANCE, GERMANY

SHOCK ABSORBING DEVICE FOR MOTOR CARS

Application filed July 17, 1929, Serial No. 373,996, and in Germany July 25, 1928.

This invention relates to improvements in shock absorbing device for motor cars and more especially to devices comprising a horizontal bar in front of the car.

The main object of the invention is to provide a device to reduce the shock if a car runs against an obstacle. A further object of the invention is to effect improvements in the means to automatically actuate braking means of the car in case the car runs against an obstacle.

I attain these and other objects by mounting a horizontal bar in front of the car on springs arranged on the frame of the car, so that said springs allow a deflection sidewise of the bar. By said deflection not only a dampening of the shock is attained but a deflection of the car proper is obtained, the car being guided off the obstacle.

In the accompanying drawings a preferred mode of construction is shown in a diagrammatical manner.

Fig. 1 is a top view of the device shown in connection with the frame of the car.

Fig. 2 is a cross-section on line A—A of Fig. 1.

Fig. 3 is a similar view on the line B—B of Fig. 1.

In the embodiment of the invention I provide a horizontal bumper bar $a$ of U-shaped cross-section. The bar $a$ is supported by two laminated springs $b$. The front ends of the springs $b$ are linked to said bar by means of two bolts $c$, and the rear end of each spring $b$ is firmly held in an eye $e$ forming part of a sleeve $f$. Each sleeve $f$ is rotatably mounted on a bolt $g$ fixed to the spring $i$ by which the frame of the car is supported by the front wheels. The bolt $g$ is fastened to said spring $i$ by means of a flanged portion $k$ in any suitable manner. On said flange $k$ a stud $h$ is fixed adapted to act as a stop to said sleeve $f$. A nut $l$ screwed on said bolt $g$ and a spring washer $s$ serves to brake the sleeve $f$ by friction and to prevent the casual turning of the sleeve $f$ on its bolt $g$ owing to the vibrations of the car when running. To the flange $k$ a stud $n$ is fastened which is provided at its free end with a piece $m$ of india rubber. The said piece $m$ forms a resilient stop for the bar $a$ when the latter is swung laterally of the car owing to the car running against an obstacle. On each bolt $c$ a flexible member $o$, a cord, rope or the like is fixed which runs over guide roller $p$ to brakes (not shown) of the car or to any other braking device such as drags etc. If the car has come in collision with an obstacle the bar $a$ is moved for instance into the position shown in dotted lines in Fig. 1. The springs $b$ are moved by the bumper so that each of the sleeves $f$ turns on its pivot $g$ and the ropes $o$ are pulled and hence caused to apply the brakes of the car.

I wish it clearly understood that I do not limit my invention to the particular means shown and described but what I claim is:—

1. In a shock absorbing device for motor cars, a bumper bar, springs yieldably supporting said bar for movement of said bar laterally of the car, and means to attach the springs to front wheel springs of said car.

2. In a shock absorbing device for motor cars, a horizontal bar, springs supporting said bar, means to attach said springs to the front wheel springs of said car, said means comprising bolts attached to the springs of the front wheels, a sleeve rotatably mounted on each of said bolt, and having mean connecting said bar supporting springs to said sleeve.

3. In a shock absorbing device for motor cars, a horizontal bar, springs supporting said bar, means to attach said springs to the front wheel springs of said car, said means comprising bolts attached to the springs of the front wheels, a sleeve rotatably mounted on each of said bolts, fastenings connecting said bar supporting springs to said sleeve, and brake operating members attached to said bar and actuated thereby when the bar is moved by collision.

4. A shock absorber for motor cars, comprising a bumper bar, spring arms having their front ends connected to the bumper bar, sleeves to which the rear ends of said spring arms are attached, bolts on which said sleeves are pivotally mounted for movement of said spring arms together with bumper bar, laterally of the car, means whereby said bolts are mounted on members of the car, buffers to limit lateral movement of the free ends of said spring arms and brake actuating elements connected to and operated by said bumper bar.

In testimony whereof I affix my signature.

XAVER SEITZ.